United States Patent [19]
Wilson et al.

[11] Patent Number: 6,141,533
[45] Date of Patent: Oct. 31, 2000

[54] METHOD AND APPARATUS FOR A MOBILE REPEATER

[75] Inventors: Christopher H. Wilson, Lake Zurich; Alan L. Wilson, Hoffman Estates; John M. Gilbert, Lake Zurich, all of Ill.

[73] Assignee: Motorola, Inc., Schaumburg, Ill.

[21] Appl. No.: 08/969,722

[22] Filed: Nov. 13, 1997

[51] Int. Cl.[7] .............................. H04B 7/15; H04B 3/36; H04Q 7/20

[52] U.S. Cl. .............................. 455/11.1; 455/7; 455/511

[58] Field of Search .................. 455/11.1, 7, 17, 455/15, 511, 16, 18, 19, 20, 509, 510; 370/327, 341

[56] References Cited

U.S. PATENT DOCUMENTS

| 4,539,706 | 9/1985 | Mears et al. .............................. 455/11 |
| 4,718,108 | 1/1988 | Davidson et al. ........................ 455/17 |
| 4,757,536 | 7/1988 | Szczutkowski et al. .................. 380/48 |
| 4,893,339 | 1/1990 | Bright et al. .............................. 380/28 |
| 5,058,199 | 10/1991 | Grube . |
| 5,133,080 | 7/1992 | Borras ........................................ 455/9 |
| 5,150,401 | 9/1992 | Ashby, III et al. ........................ 380/29 |
| 5,179,720 | 1/1993 | Grube et al. . |
| 5,185,796 | 2/1993 | Wilson ..................................... 510/409 |
| 5,185,797 | 2/1993 | Barrett et al. .............................. 380/21 |
| 5,235,598 | 8/1993 | Sasuta ..................................... 370/327 |
| 5,239,678 | 8/1993 | Grube et al. . |
| 5,265,262 | 11/1993 | Grube et al. . |
| 5,293,638 | 3/1994 | Sasuta et al. .............................. 455/16 |
| 5,301,353 | 4/1994 | Borras et al. ................................ 455/9 |
| 5,305,384 | 4/1994 | Ashby et al. .............................. 380/29 |
| 5,355,517 | 10/1994 | Olson ....................................... 455/510 |
| 5,410,602 | 4/1995 | Finklestein et al. ....................... 380/21 |
| 5,442,809 | 8/1995 | Diaz et al. .............................. 455/511 |
| 5,502,767 | 3/1996 | Sasuta et al. .............................. 380/48 |
| 5,613,196 | 3/1997 | Barnes et al. .............................. 455/15 |
| 5,857,144 | 1/1999 | Mangum et al. ....................... 455/11.1 |
| 5,907,794 | 5/1999 | Lehumusto et al. .................... 455/11.1 |

Primary Examiner—William G. Trost
Assistant Examiner—Joy K Redmon
Attorney, Agent, or Firm—Steven R. Santema

[57] ABSTRACT

A mobile repeater (300) is improved to include a database (303) that allows the mobile repeater to store registrations received from subscriber units. Additionally, the mobile repeater may include a voice on control switching element (309) for use with an extended control channel. Further still, the mobile repeater may include encryption elements (305–308) for the maintenance of encrypted control channels. In this manner, the mobile repeater may provide an improved quality of services to subscriber units.

12 Claims, 5 Drawing Sheets

METHOD AND APPARATUS FOR A MOBILE REPEATER

FIELD OF THE INVENTION

The present invention relates generally to wireless communication systems and, in particular, to mobile repeaters or use within such wireless communication systems.

BACKGROUND OF THE INVENTION

Repeater systems for radios are well known in the art. Repeaters are normally radios which are fixed in a single geographical location, with a favorably situated antenna that can provide communication services to a large geographical area. The communication services are typically provided to vehicular mobile radios and/or in-hand portable radios. Repeaters are often classified as fixed equipment, and the attached radio system is often referred to as fixed infrastructure equipment. The mobile and/or portable radios are often referred to generally as subscriber units. Fixed repeater equipment is advantageous for covering the largest possible area, but it often cannot provide coverage in areas that are obstructed relative to the fixed antenna location. This condition is particularly common when the subscriber units in a system have small antennas and when the subscriber units are operated inside of buildings or behind obstructions.

An especially useful type of fixed infrastructure equipment is for trunked radio systems. A trunked fixed infrastructure typically uses several radio frequency (RF) channels as communication resources. These resources are assigned dynamically to subscriber units as they demand service, and the resources are released for other subscriber units after the demanded service is completed. The subscriber units demand services by transmitting service requests to the trunking fixed infrastructure via a special resource designated as a control channel. The assigned communication resources are generally known as traffic channels. Traffic channels can be used to transmit voice information, data information, or other useful information that users of subscriber units want or need. The communication resources can be provided by Frequency Division Multiple Access (FDMA) radio channels, by time slots on a Time Division Multiple Access (TDMA) radio channel or channels, by spreading codes on a Code Division Multiple Access (CDMA) radio channel or channels, or any other feasible multiple access technology.

Mobile repeater systems for extending the coverage of fixed equipment are well known in the art. FIG. 1 illustrates a prior art embodiment of a wireless communication system 100 comprising a fixed infrastructure 101, a subscriber unit 102 and mobile repeater 103. The fixed infrastructure 101 typically consists of fixed repeaters, antennas, and other equipment which provides coverage throughout a large geographical area. Although shown as a single element in FIG. 1, the fixed infrastructure 101 typically encompasses multiple repeaters at multiple sites, each with one or more antennas, and any other equipment necessary to interconnect and/or control such multiple sites and repeaters. The subscriber unit 102 obtains service from the fixed infrastructure 101 via a traffic channel 106 and a control channel 107. The control channel 107 is used by the subscriber unit 102 to request service, and the fixed infrastructure 101 typically provides service by assigning a traffic channel 106. Often, the traffic channel 106 conveys voice communications, but it can also convey data or other useful information for the subscriber unit 102. The subscriber unit 102 communicates directly with other subscriber units (not shown), or via communication resources provided by the fixed infrastructure, such as telephone service via telephone wire lines. The mobile repeater 103 can act as a subscriber unit via the same traffic channel 106 or control channel 107. The mobile repeater 103 can extend coverage of a radio system by repeating the traffic channel 106 on an extended channel 108 which can be used by the subscriber unit 102 if it is not in range of the fixed infrastructure 101.

In FIG. 1, the extended channel 108 does not extend the control channel 107 to the subscriber unit. As such, the control information to request service from the fixed infrastructure 101 or to deliver service from the fixed infrastructure cannot extend to the subscriber unit 102 over the extended channel 108. Only the basic bearer service itself, such as the voice information, can be extended. This means that control information, such as a unit identification (ID) or a talk group ID, has to be synthesized by the mobile repeater 103 without any connection or assistance from the subscriber unit 102. This also means that the mobile repeater 103 is unable to determine if the subscriber unit 102 is in range to receive any delivered service, nor is the mobile repeater able to deliver useful services like call alerts, pages, or other control information. In essence, the extended channel 108 reduces the range of available service to the subscriber unit, when compared to the service provided by the fixed infrastructure 101 via the control channel 107 and traffic channel 106.

The problem of extending a control channel has been addressed in U.S. Pat. No. 5,179,720 by Grube et al. entitled METHOD AND APPARATUS FOR EXTENDING COVERAGE OF A TRUNKED RADIO COMMUNICATIONS SYSTEM (hereinafter "the '720 patent"). The '720 patent explains how to repeat an infrastructure-based control channel so that a subscriber unit is provided with a duplicate control channel. The assignment of communication resources is a problem in such a system because the extended resources are not the same as the resources controlled by the infrastructure. Consequently, if channel assignments from the fixed infrastructure are simply repeated without conversion, it would appear to the otherwise out-of-range subscriber unit that it has been assigned infrastructure-based resources instead of extended resources, and the subscriber unit would not be able to communicate. The '720 patent solves this problem by providing repeaters that map the infrastructure-based resources to extended resources, and vice versa, so that communications may take place. In this way, the simplest trunking fixed infrastructure service can be extended through a control channel to the subscriber unit.

While the '720 patent explains how to map infrastructure-based resources to extended resources using either a fixed or mobile repeater, it fails to describe how to provide other trunking services. In particular, subscriber units are mobile enough to move between the coverage areas of different repeaters, or from the coverage area of a fixed infrastructure to that of a mobile repeater. When the subscriber unit moves to a new coverage area, it needs to notify the fixed infrastructure or the mobile repeater of this change so that service can be properly routed to the subscriber unit. Again, referring to FIG. 1, if the subscriber unit 102 starts in the coverage area of the fixed infrastructure 101, it begins by registering with the fixed infrastructure 101. This allows the fixed infrastructure 101 to know to assign communication resources 106 to the subscriber unit 102 when service is necessary. If the subscriber unit 102 goes out of the coverage area of the fixed infrastructure 101 and into the coverage area of the mobile repeater 103, then it needs to register its presence with mobile repeater 103. This would allow the mobile repeater 103 to assign resources 108 for any service to/from the subscriber unit 102. The '720 patent does not explain how this could be done.

Additionally, the prior art does not explain how to protect the communication resources for the system, namely how to encrypt them. The protection of communication resources from unauthorized or undesired use is typically accomplished by encrypting the infrastructure-based control channel(s). This encryption is done in a synchronous manner so that the control channel(s) can be decrypted by subscriber units, the fixed infrastructure, or mobile repeaters. However, the prior art fails to teach how to extend encrypted control channels to subscriber units.

In view of these shortcomings of the prior art, it would be advantageous to provide a mobile repeater that can extend coverage of trunked radio systems so as to provide full registration and protection of the services of the system.

DESCRIPTION OF A PREFERRED EMBODIMENT

The present invention provides various embodiments of an improved mobile repeater and methods pertaining to its use. In one embodiment, the mobile repeater is improved to include means for communicating with a subscriber unit via a control channel that is temporarily converted, from time to time, to a voice channel. In another embodiment, the improvement comprises a database that allows the mobile repeater to store registrations received from a subscriber unit. In yet another embodiment, the improvement comprises encryption synchronization means such that the mobile repeater can maintain encrypted control channels. Furthermore, the improved mobile repeater may encompass all of these improvements. In this manner, the present invention surpasses the teachings of the prior art regarding mobile repeaters to improve the quality of services offered to the subscriber unit.

Figure 1:
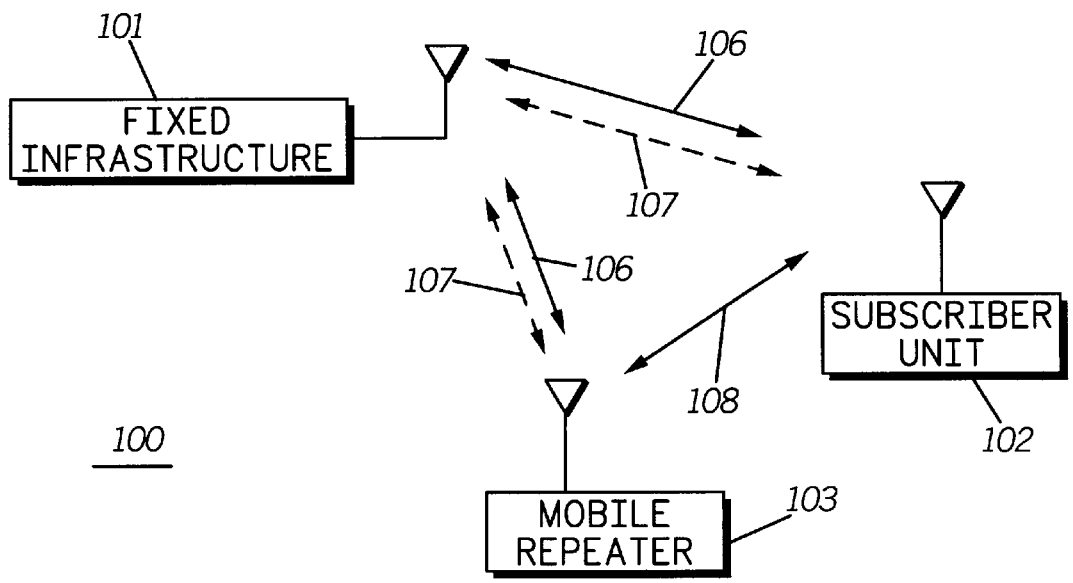
FIG. 1 is a block diagram of a wireless communication system in accordance with the prior art.
Figure 2:
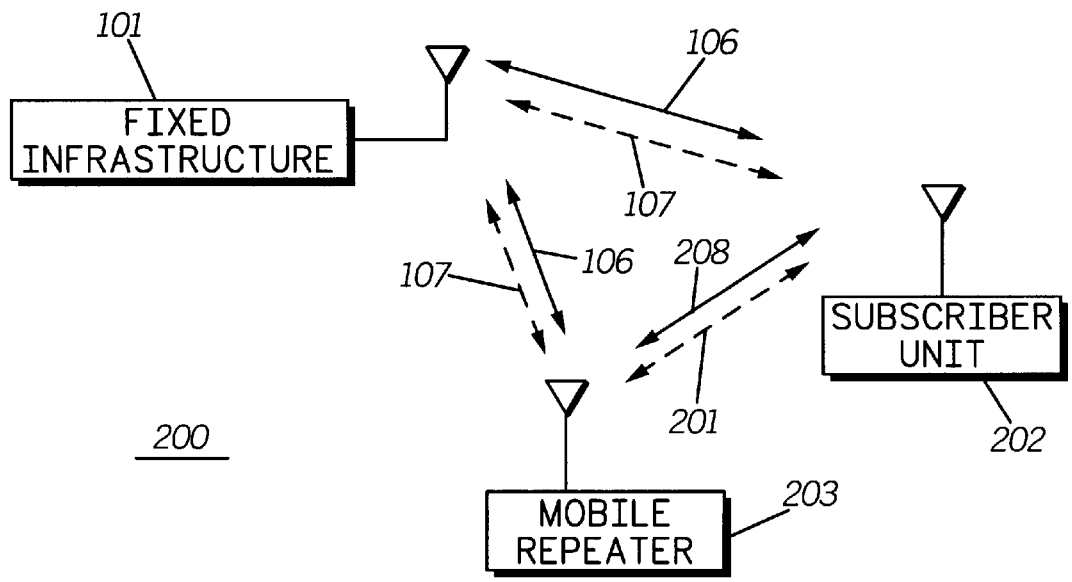
FIG. 2 is a block diagram of a wireless communication system in accordance with the present invention.

The present invention can be more fully described with reference to FIGS. 2-7. FIG. 2 is a block diagram of a wireless communication system 200 comprising a fixed infrastructure 101, a subscriber unit 202, and a mobile repeater 203. Note that only a single subscriber unit 202 and mobile repeater 203 are shown for simplicity. The fixed infrastructure 101 functions in essentially the same manner as described above with regard to FIG. 1 in that it uses a control channel resource 107 to receive service requests from, and transmit control messages (including assignments of traffic channels 106) to, the subscriber units 202 and mobile repeaters 203.

In accordance with the present invention, the mobile repeater 203 provides communication services in a manner essentially equivalent to the fixed infrastructure 101. The mobile repeater provides an extended control channel 201 that is used by the subscriber unit 202 to request service and/or receive control messages from the mobile repeater 203. For those services requiring a traffic channel, the mobile repeater 203 assigns an extended traffic channel 208. Traffic that is conveyed from the fixed infrastructure 101 to the subscriber unit 202 via the mobile repeater 203 entails the reception of traffic from the traffic channel 106 and retransmission on the extended traffic channel 208. Traffic that is conveyed from the subscriber unit 202 to the fixed infrastructure via the mobile repeater 203 entails the reception of traffic from the extended traffic channel 208 and retransmission on the traffic channel 106. Repeating subscriber traffic from one traffic channel to another is well known in the art. Virtually any type of traffic channel, whether it uses FDMA, TDMA, CDMA, or any other multiple access technology, may be incorporated for use in the present invention.

In many cases of interest, it is possible to mix traffic and control on the same channel resource. TDMA systems often do this by assigning a TDMA slot for control purposes. FDMA systems may do this by interleaving traffic and control information, or by switching between a traffic mode and control mode. This mixing of traffic and control is sometimes known as Voice on Control (VOC) and, in the prior art, is typically applied to infrastructure-based resources, e.g., the traffic and control channels 106, 107. As incorporated into the present invention, VOC is useful to limit the number of physical channels provided by the mobile repeater 203 to the subscriber unit 202. In the VOC implementation, the extended traffic channel 208, and the extended control channel 201 are switched depending on the operating mode of the subscriber unit 202. When the subscriber is idle, the physical channel is operated as the extended control channel 201, monitored by the subscriber unit 202. When any service is to be provided to the subscriber unit 202, the physical channel (under the control of the mobile repeater 203) switches out of the control mode, and operates as the extended traffic channel 208.

Figure 3:
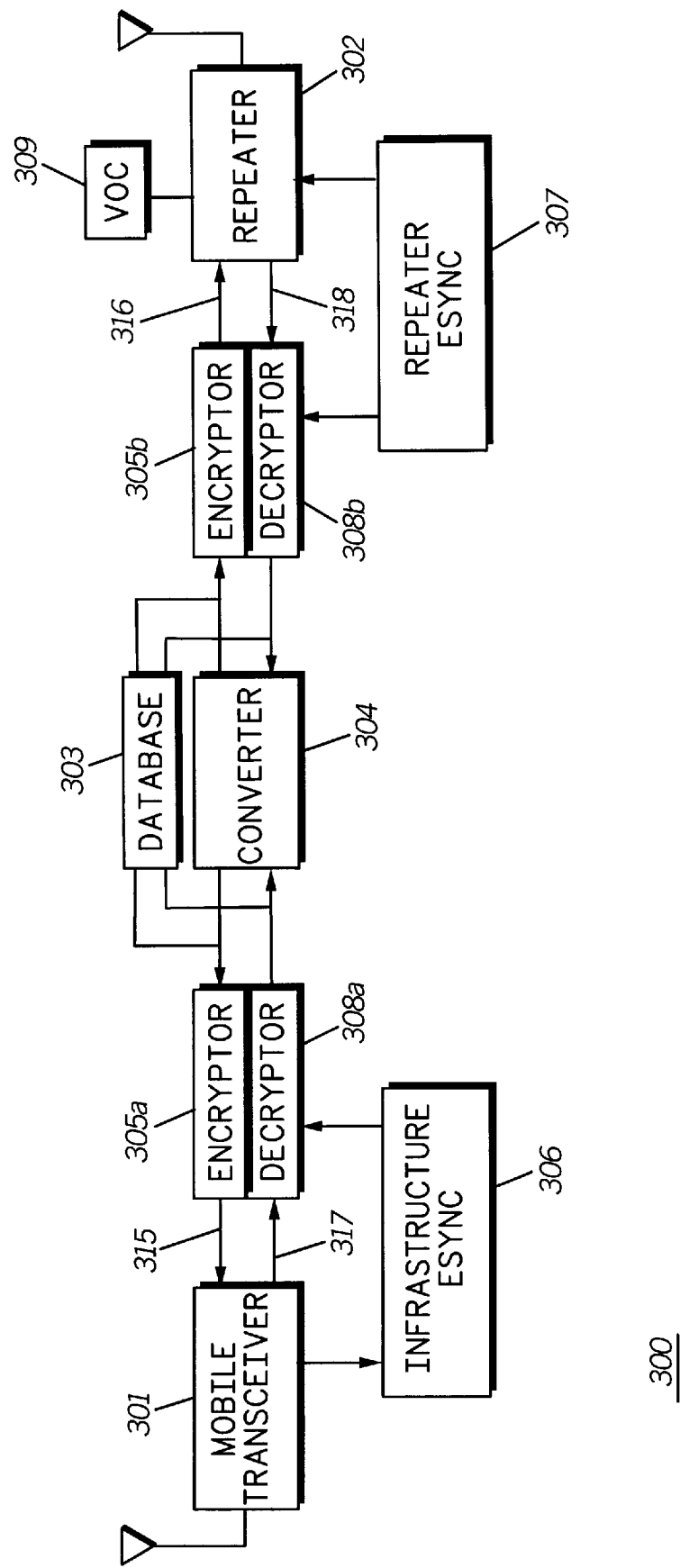
FIG. 3 is a block diagram of a mobile repeater in accordance with the present invention.

FIG. 3 is a block diagram of a mobile repeater 300 in accordance with the present invention. The mobile repeater 300 comprises a mobile transceiver 301, a repeater 302, a database 303, a converter 304, encryptors 305, decryptors 308, infrastructure encryption synchronization means 306, repeater encryption synchronization means 307, and a voice on control (VOC) switch element 309, all configured as shown.

The mobile transceiver 301 maintains communication with a fixed infrastructure via a control channel or channels and a traffic channel or channels (not shown). The repeater 302 maintains communication with a subscriber unit via an extended control channel or channels and an extended traffic channel or channels (not shown). Optionally, the repeater 302 may mix the control and traffic channels by switching between the control and traffic modes of operation on a single physical channel resource using VOC switch element 309. The VOC switch element 309 may be conveniently implemented as a software routine executed by a processor device, or it may be implemented as a hardware switch that responds to the mode of operation of a subscriber unit.

The control channels (both on the mobile transceiver 301 side and the repeater 302 side) may optionally be encrypted and decrypted with respective encryptors 305 and a decryptors 308. In particular, an outbound decryptor 308a operates in conjunction with an outbound encryptor 305b, and an inbound decryptor 308b operates in conjunction with an inbound encryptor 305a, as described in further detail below. Any of a number of well-known encryption and decryption algorithms may be used for the present invention. For example, the Data Encryption Standard (DES), published by the American National Standards Institute (ANSI) as American National Standard X3.92, is one widely used algorithm that would be suitable for use with the present invention.

A matter of design choice, encryption and decryption may be implemented in hardware or software. When implemented in software, the encryption and decryption functions are typically embodied in a single procedure which may be invoked by either the mobile transceiver 301 or the repeater 302. When embodied in hardware, each of the encryption and decryption functions may be implemented in a separate device (often referred to as key generators or KGs) or, with the advent of improved KGs, in one or two separate devices operating at higher speeds. In the preferred hardware embodiment, the encryptors 305 and decryptors 308 are implemented in a single KG.

In cases where the control channel resources are not encrypted, the encryptors 305 and decryptors 308 may be replaced with direct connections. It is also possible that one or more of the encryptors 305 and/or decryptors 308 could be bypassed during operation of the mobile repeater 300. For example, if the mobile transceiver 301 communicates via an encrypted control channel but the repeater 302 does not need to, then the outbound encryptor 305b and inbound decryptor 308b would not be needed.

When the control channel resources for the fixed infrastructure and the repeater 302 are encrypted and decrypted (with different synchronization described below), part of the transfer of control information from the subscriber unit to the fixed infrastructure, and vice versa, is to decrypt and then re-encrypt the control information. Encrypted outbound control channel (CC) information (control messages) from the fixed infrastructure arrives at the mobile transceiver 301 and passes through the first outbound path 317, to the outbound decryptor 308a which provides decrypted outbound CC information to the converter 304 and database 303. The decrypted outbound CC information is passed through the converter 304 (with or without alteration or filtration) to the outbound encryptor 305b which in turn provides re-encrypted outbound CC information via a second outbound path 316 to the repeater 302 for transmission to the subscriber unit. In the opposite direction, encrypted inbound CC information (control messages) from the subscriber unit arrives at the repeater 302 and passes through a first inbound path 318 to the inbound decryptor 308b. The resulting decrypted inbound CC information passes through the converter 304 (with or without alteration or filtration) to the inbound encryptor 305a which in turn provides re-encrypted inbound CC information via a second inbound path 315 to the mobile transceiver 301 for transmission to the fixed infrastructure.

As known in the art, encryption of continuous clear text (unencrypted information) is achieved by concurrently generating a continuous stream of pseudo-random information, often referred to as a keystream, at the transmitting end that is combined on an ongoing basis with the clear text. At the receiving end, the encrypted information is recombined with the identical keystream to reproduce the clear text. For this to work, the keystream at the receiving end must identically match the keystream used at the transmitting end, i.e., the transmitting and receiving keystreams must be synchronized. To this end, encryption synchronization (esync) is typically provided. For example, the DES standard requires a 64-bit esync. The esync for the encryptor and decryptor, will, in general, be different. Typically, esync is controlled from one end of a given communication channel and propagated to the other end. For the purposes of the present invention, a device that "generates" esync information acts as the source of that esync information, whereas a device the "maintains" esync information merely operates in accordance with esync information sourced by another device.

In the case of the control channel between the fixed infrastructure and the mobile repeater 300, the esync information for both encryption and decryption is generated by the fixed infrastructure and transmitted to the subscriber units and mobile transceivers 301. When received by the mobile transceiver 301, this esync information is passed to the infrastructure esync means 306 which maintains the esync information such that the control channel(s) transceived by the mobile transceiver 301 may be properly encrypted and decrypted. Preferably, the infrastructure esync means 306 is implemented in software, although hardware-based implementations are possible. Precise details of the encryption sync function are well-known in the art. For example, Association of Public Safety Communication Officers (APCO) Project 25 defines an encrypted control channel esync function as proposed in Telecommunications Industry Association (TIA) bulletin, TSB102.AABD. Esync is also explained in U.S. Pat. No. 5,502,767 by Sasuta et al. entitled METHOD FOR MAINTAINING SECURE INFORMATION SYNCHRONIZATION ON A CONTROL CHANNEL, the teachings of which patent are herein incorporated by this reference. In general, the infrastructure esync means 306 occasionally receives via the mobile transceiver 301 updated esync information from the fixed infrastructure, which esync information is used to periodically clock the esync in step with control channel. The esync information is then provided to the inbound encryptor 305 and outbound decryptor 308a so that the encrypted control channel can operate correctly. The repeater esync means 307 operates in a slightly different manner from the infrastructure esync means 306. The repeater 302 must act as the source of esync for all the subscriber units 102 which are to be served by the mobile repeater 300. Consequently, the esync information for the outbound encryptor 305b and inbound decryptor 308b are generated by the repeater esync means 307. Additionally, when provided to the repeater 302, the esync information generated by the repeater esync means 307 is periodically transmitted to the subscriber units. The transmission of this esync information allows the subscriber units to maintain their copies of the esync for proper operation of the encrypted control channel. The repeater esync means 307 is preferably implemented in software, although hardware-based implementations are possible.

The converter 304 operates to convert, when necessary, control messages received from the fixed infrastructure (outbound control channel information) to control messages suitable for transmission via the extended control channel provided by the repeater 302. Likewise, the converter 304 operates to convert, when necessary, control messages received from subscriber units (inbound control channel information) to control messages suitable for transmission via the control channel used by the mobile transceiver 301. As those having ordinary skill in the art will appreciate, the conversions performed by the converter 304 include the translation of channel assignments for calls assigned by the fixed infrastructure to channel assignments serviced by the repeater 302. Other conversions are also necessary on system broadcast updates, which indicate the identity of the system and control channel. The update messages transmitted by the fixed infrastructure correspond to resources and services for the fixed infrastructure, and these are generally different from the resources supported by the mobile repeater 300. The converter function 304 is responsible for filtering these messages and converting them to properly represent the mobile repeater 300 as a trunking system that is separate from the fixed infrastructure.

The database 303 operates to process registration messages from subscriber units destined for the mobile repeater 300 that arrive via the extended control channel resource on repeater 302. Such registration messages from subscriber units indicate the presence of the subscriber unit within the extended coverage area of the mobile repeater 300, and the subscriber unit's readiness to accept service from the mobile repeater 300. The database 303 stores the identity of the subscriber unit and also stores an indication of the registration of the subscriber unit with the mobile repeater 300. The database 303 also allows the mobile repeater 300 to act as a proxy for the subscriber unit with the fixed infrastructure. That is, the database 303 registers the presence of the subscriber unit within the coverage area of the fixed infrastructure so that service will be extended by the fixed infrastructure to the mobile repeater 300 and then to the subscriber unit itself.

Figure 4:
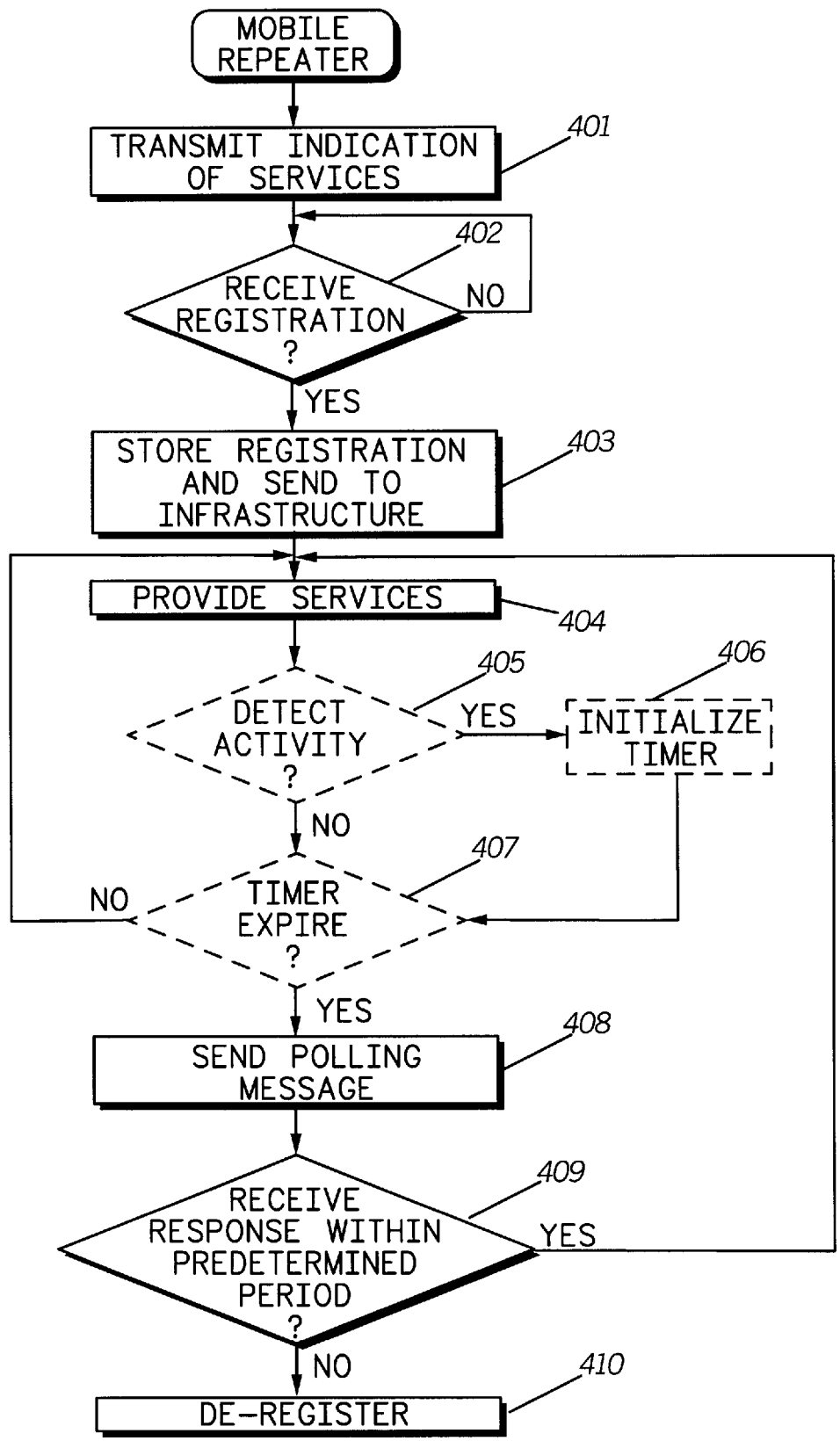
FIG. 4 is a flow chart illustrating a first embodiment of a method for use in a mobile repeater in accordance with the present invention.

FIG. 4 is a flow chart of a first embodiment of a method for use in a mobile repeater in accordance with the present invention. At step 401, an indication of services is transmitted by the repeater 302 via the extended control channel to all subscriber units within the coverage area of the mobile repeater 300. If encryption is used, the indication of service is encrypted by the outbound encryptor 305*b*. In practice, the indication of services is generated by a control function (not shown in FIG. 3) of the mobile repeater 300. In the preferred embodiment, several possible status update messages may be used to indicate services. For example, APCO Project 25 Trunking Control Channel Messages defined in TIA bulletin TSB102.AABC, defines an RFSS Status Broadcast message to identify the system, subsystem, site, channel, and services. This information is provided by the mobile repeater 300 so that the subscriber units are made aware of the availability of service, and could attempt to register with the mobile repeater 300.

At step 402, the mobile repeater 300 awaits registration requests from subscriber units. Trunking systems in the art provide several possible registration request messages. For example, the TIA bulletin TSB102.AABC defines a Unit Registration Request message that includes a complete 56-bit unit identity that includes a home system identity to allow the mobile repeater 300 to determine where the home system for the subscriber unit is. Upon receipt of a registration message from a subscriber unit via the repeater 302, the process proceeds to step 403. At step 403, the mobile repeater acknowledges the registration from the subscriber unit via repeater 302, and the registration is stored in database 303. For example, the TIA bulletin TSB102.AABC defines a Unit Registration Response message which assigns a working unit ID to the subscriber, and indicates a Response Value to signify if registration was accepted, failed, denied, or refused. These different Response Values indicate different forms of acceptance by the mobile repeater to allow service, restricted services, or to deny service so as to cause the subscriber unit to search elsewhere on other channels, perhaps for other systems.

Having stored the registration in the database 303, the mobile repeater 300 can provide service to the subscriber unit at step 404. For example, if one subscriber unit wished to call another subscriber unit in the vicinity of the mobile repeater 300, the mobile repeater 300 could simply assign a channel for the subscriber units, switch the repeater 302 to the channel, and repeat the call from one subscriber to another. The channel may well be the same physical frequency as the control channel resource, in which case the VOC switch element 309 would activate the repeater to operate in a traffic channel mode so that one subscriber could talk to another.

It is also possible for the mobile repeater 300 to act on the registration stored in the database 303 by registering the subscriber unit with the fixed infrastructure at step 403. The mobile repeater 300 (via a control function not shown) would execute a registration request with the fixed infrastructure and receive a registration response in the same way that the subscriber unit initiated the transaction, except that the mobile repeater 300 acts as a proxy for the subscriber unit. The registration request to the fixed infrastructure serves to notify the fixed infrastructure of the presence of the subscriber unit, so that calls to the subscriber will be properly routed to the site with the mobile repeater 300. The registration response from the fixed infrastructure can serve to update the database 303 as to the validity of the subscriber unit identity. For example, a registration denial with a deny reason code signifying an invalid or unauthorized subscriber identity would stimulate database 303 to modify its entry for the subscriber identity, and also possibly to deregister the subscriber unit.

Other useful services which can be provided by the mobile repeater 300 are supplementary services which consist of control messages. One prevalent and useful example is an Emergency Alarm sent by the subscriber unit in the event of an unusually urgent situation. The TIA bulletin TSB102.AABC describes trunking messages that include several such supplementary services, including Emergency Alarm, Status Update, Message Update, Call Alert, Radio Inhibit, and Radio Unit Monitor. Emergency Alarm is described here as representative of the other supplementary services available on trunked systems. Emergency Alarm begins when a subscriber unit activates a switch to set off the alarm function. This causes the subscriber unit to transmit an Emergency Alarm message to the mobile repeater 300 which includes the identity of the subscriber unit with the alarm. The database 303 is used to determine the validity of the subscriber, from the previous registration transaction, and so the alarm can be passed through the converter 304 to the mobile transceiver 301 where it is transmitted to the fixed infrastructure. The fixed infrastructure responds with an Acknowledgment to signify receipt of the Emergency Alarm, and this is then received by the mobile transceiver 301 converted (if necessary) by converter 304, and transmitted by repeater 302 to the subscriber unit 102. By this operation, the mobile repeater 300 has provided the identity of the subscriber unit, via a control channel, to the fixed infrastructure, so that a dispatcher in the fixed infrastructure can hear the alarm, and take appropriate action—such as calling other units in the vicinity to respond to the emergency situation.

At step 405, the mobile repeater 300 attempts to detect activity by registered subscriber units. Activity can occur anytime the subscriber unit sends any sort of transmission to the mobile repeater 300. Such activity would signify the presence of the subscriber unit, and initialize a timer at step 406. The mobile repeater 300 then proceeds to step 407 to detect if activity timers for any registered subscribers have expired. When such a time expires, the mobile repeater proceeds to step 408 to stimulate the subscriber to respond. It does so by transmitting a polling message through the repeater 302 to the subscriber unit whose timer expired. If the subscriber unit responds at step 409 to indicate its continued presence, the mobile repeater returns to step 404, where it will subsequently detect activity and restart the timer at step 406, as necessary. If the subscriber unit does not respond within a predetermined period of time at step 409, the database deregisters the subscriber unit at step 410. The predetermined period of time is a matter of design choice, and typically would be on the order of seconds to minutes in duration.

The use of activity timers in steps 405–407, is but one of many ways to determine the presence or absence of registered subscribers. Subscribers may also register elsewhere in the system, for example, with the fixed infrastructure. In such cases, the service for subscribers will be separately routed by the fixed infrastructure, bypassing the mobile repeater 300. It is also possible for the subscriber to deregister itself. For example, subscribers which power down can transmit a deregistration message to cause the mobile repeater to proceed directly to step 410. It is also possible for the mobile repeater 300 to power down, in which case it deregisters all of the registered subscriber units itself. One other method is to simply periodically poll the subscriber unit from time to time (e.g., every minute) depending on the load of the mobile repeater 300. This method would only execute steps 408 and 409; thus steps 405–407 are optional. In the degenerate case, the poll would occur immediately after service, i.e., the polling time would be set to zero. In this case, registration only takes effect for the duration of subscriber service requests.

Figure 5:
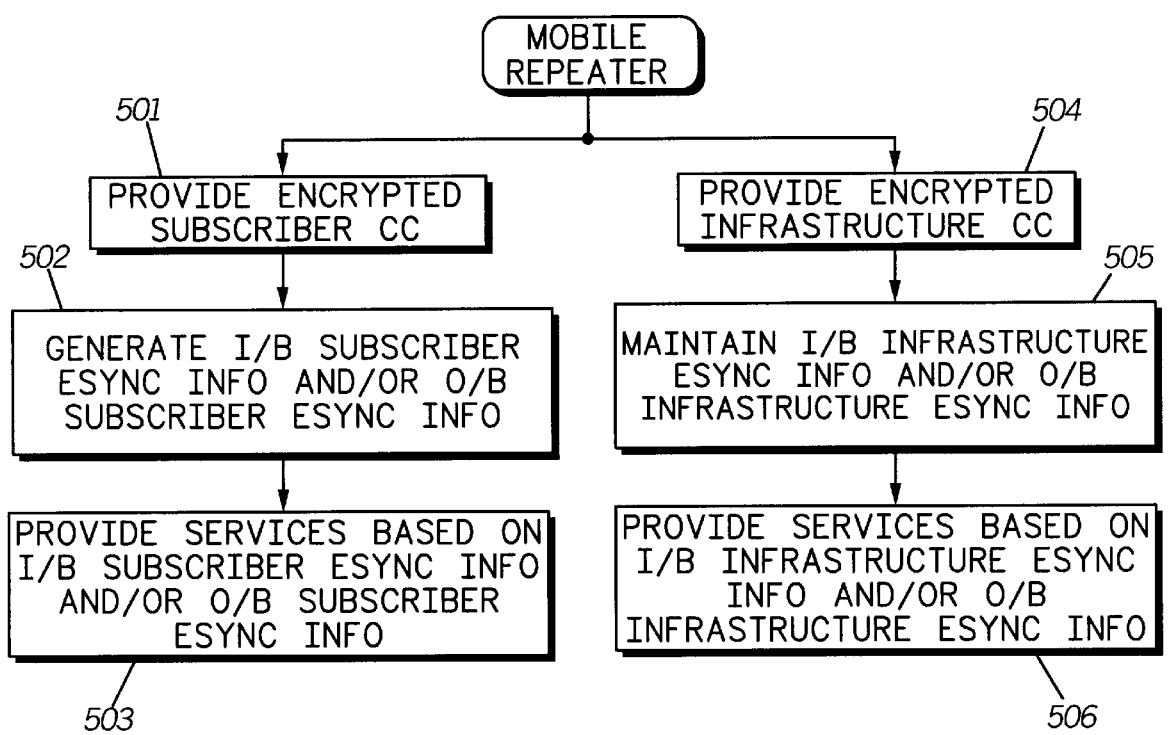
FIG. 5 is a flow chart illustrating a second embodiment of a method for use in a mobile repeater in accordance with the present invention.

FIG. 5 is a flow chart of a second embodiment of a method for use in a mobile repeater for an encrypted control channel in accordance with the present invention. In particular, the steps shown in FIG. 5 further describe the operation of the encryption-related elements shown in FIG. 3 and described above. At step 501, the mobile repeater 300 initiates separate esyncs for both the inbound and outbound portions of a subscriber (extended) control channel. At step 502, these esyncs are independently clocked and updated according to the protocol for the control channel by the repeater esync means 307. For example, as explained in APCO Project 25, the esync is incremented every 7.5 msec, in step with microslot boundaries that are transmitted on the subscriber control channel by the repeater 302. The inbound esync for the inbound decryptor 308*b* is provided by the repeater esync means 307 after it has been broadcast by the repeater 302. The outbound esync is broadcast by the repeater 302 to the subscriber units and it is also provided to the outbound encryptor 305*b*. The mobile repeater 300 provides services using the subscriber control channel at step 503 by routing inbound and outbound control channel information through the inbound decryptor 308*b* and outbound encryptor 305*b*, respectively.

Steps 504–506 are typically performed concurrently with steps 501–503. At step 504, the esyncs for the inbound and outbound portions of an infrastructure control channel are provided by the fixed infrastructure to the infrastructure esync means 306. As described above, the infrastructure esync means 306 then maintains esync, at step 505, for the infrastructure control channel. Services from the fixed infrastructure are then provided in step 506 using the encrypted inbound and outbound infrastructure control channel via the outbound decryptor 308*a* and inbound encryptor 305*a*, respectively.

Figure 6:
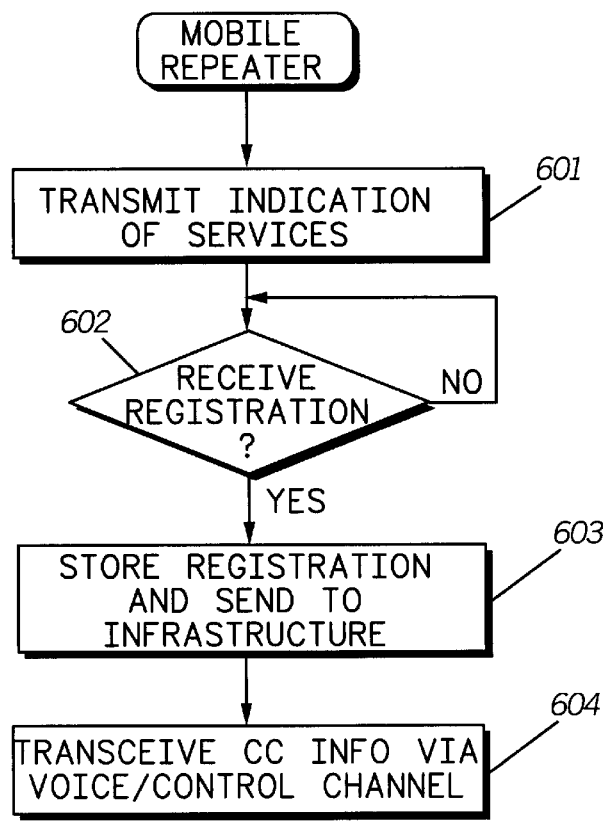
FIG. 6 is a flow chart illustrating a third embodiment of a method for use in a mobile repeater in accordance with the present invention.

FIG. 6 is a flow chart of a third embodiment of a method for use in a mobile repeater in accordance with the present invention. Steps 601–603 describe operation of the mobile repeater 300 with regard to registration of a subscriber unit with the mobile repeater 300 and are essentially the same as steps 401–403, discussed above relative to FIG. 4.

After a subscriber unit has successful registered with the mobile repeater 300, the mobile repeater 300 provides service at step 604 based on usage of the subscriber control channel. For example, service is provided by converting service requests (control messages) received from subscribers units to service requests to be sent to the infrastructure, and then converting channel assignments for service from the infrastructure, to equivalent channel assignments for the subscriber unit. More particularly, this third embodiment uses a VOC control channel as the subscriber control channel, as provided by the VOC switch element 309. It should be apparent to those having ordinary skill in the art that the switch between control and traffic can occur for other traffic besides voice information, notwithstanding the title "VOC." Traffic can include data packets, video information, or other non-voice information that may be useful to subscribers. The "VOC" term is a convenient label used to denote a mixture of traffic and control information on a single channel.

Figure 7:
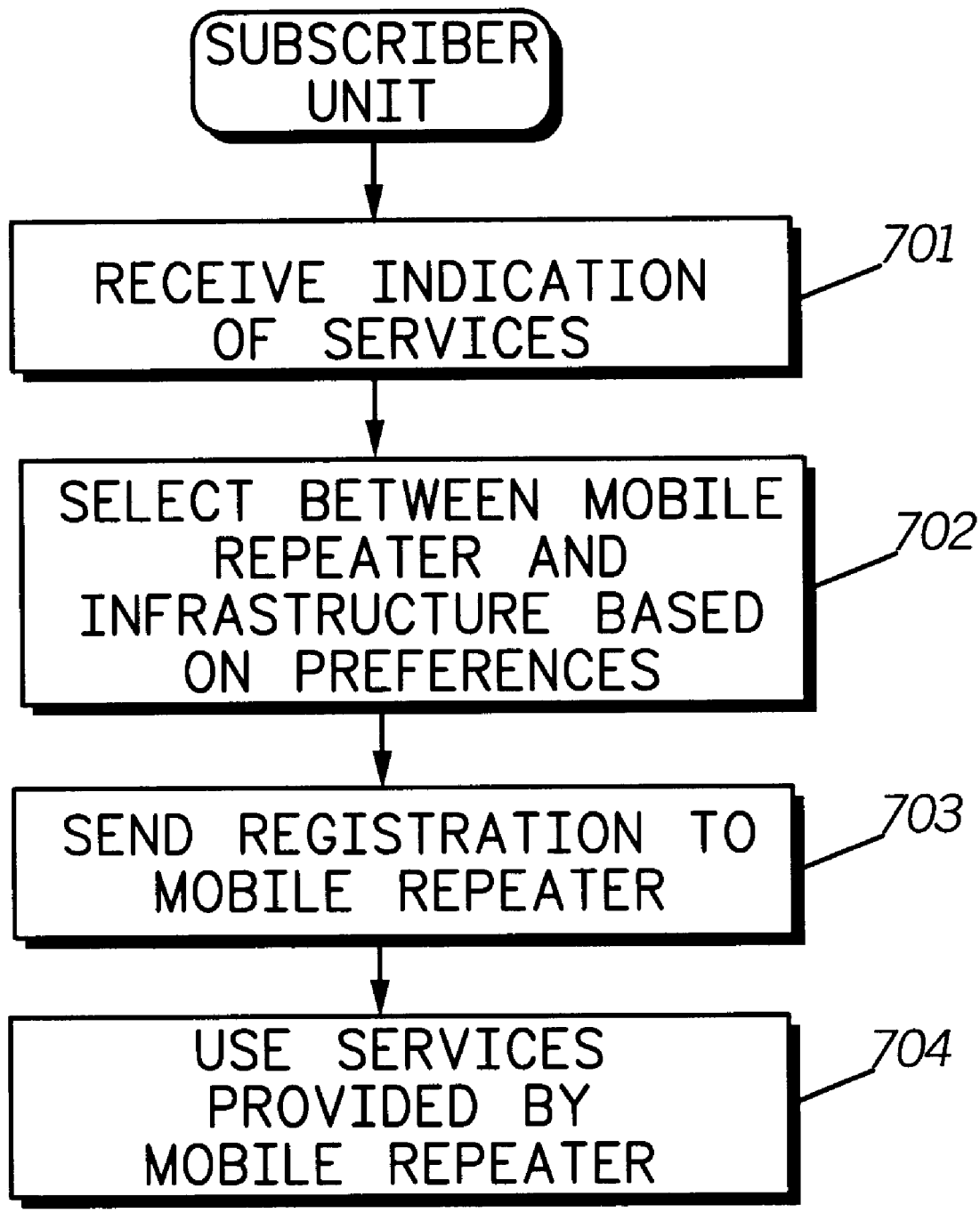
FIG. 7 is a flow chart illustrating a method for use in a subscriber unit in accordance with the present invention.

FIG. 7 is a flow chart of a method for use in a subscriber unit in accordance with the present invention. At step 701, the subscriber unit receives an indication of services available from either the fixed infrastructure or the mobile repeater 300. Such an indication is discussed above regarding step 401 of FIG. 4 in the context of the mobile repeater 300; it is equally applicable to the fixed infrastructure. Note that the subscriber unit, in systems adhering to APCO Project 25 procedures, does not need to receive a specific RFSS Status Broadcast message in order to proceed to step 702. In such systems, the subscriber unit hunts for a control channel, and uses any relevant control channel message as an indication of a valid control channel. Since each message also includes an indication of System Identity, the subscriber unit can proceed to step 702 if it recognizes the system. If not, it may pause for a period of time (usually a few seconds) to receive a status broadcast message to give it more information about the system, such as channel frequencies, network identity, site identity, sub system identity, and system status. If these indicate the availability of useful service for the subscriber, then the subscriber may proceed to step 702.

After receipt of the service indication, the subscriber unit will determine whether or not to register at step 702. In a system with a mobile repeater, as depicted in FIG. 2, it is possible for the subscriber to obtain an indication from both a mobile repeater and fixed infrastructure. In this case, the subscriber unit must decide where to register its presence for the best service. This is easily done with some preferences programmed into the subscriber unit. These preferences can be based on the availability of specific services (e.g., data or voice services). A particularly useful service for two-way radios is voice service, so the availability of voice service could be a preference. Another possible service is data service, such as an Internet connection to the World Wide Web, in which case the subscriber unit would disregard voice service, but search for data service instead. A third possible preference can be based on the quality of service. In this case, stronger signals with better fidelity from one subsystem might be selected in preference to weaker signals from another subsystem. The preferences enumerated herein are representative only, and it is understood that other criteria known to those having ordinary skill in the art may also be used.

After the selection of the preferred service provider, the subscriber proceeds to step 703 where it registers with the mobile repeater 300. Registration with a fixed infrastructure is well known in the art. The registration performed by the subscriber unit at step 703 is the complement to the mobile repeater operation described above relative to step 402, i.e., the subscriber unit transmits a registration request message to the mobile repeater 300. After the subscriber unit receives an acknowledgment of registration it proceeds to step 704 where it requests, and obtains, service from the mobile repeater 300.

With the present invention, a method and apparatus for an improved mobile repeater is provided. In particular, a database is provided thereby allowing the mobile repeater to receive and store registrations of subscriber units. As a result, the mobile unit can act as a proxy for registration of the subscriber unit with the wireless communication system. This allows subscribers to independently choose between service from a mobile repeater and service from a fixed infrastructure, so as to obtain the highest quality of service. Additionally, the present invention enhances security in wireless communication systems through the provision of encryption capability in mobile repeaters. This protection of the service further extends to prevent adversaries from monitoring control channel traffic and service requests and grants for particular subscribers. Further still, the present invention incorporates the use of a composite traffic and control channel as an extended control channel, thereby allowing a single physical channel to provide both extended traffic and control channel resources to subscribers.

Although the present invention has been described with reference to certain preferred embodiments, numerous modifications and variations can be made by those skilled in the art without departing from the novel spirit and scope of the present invention.

We claim:

1. A mobile repeater comprising:
   a mobile transceiver arranged and constructed to communicate with a fixed infrastructure;
   a repeater, operably coupled to the mobile transceiver, arranged and constructed to communicate with at least one subscriber unit;
   a converter, operably coupled to the mobile transceiver and the repeater, arranged and constructed to convert, when necessary, outbound control channel information, received by the mobile transceiver, to control channel information suitable for transmission via the repeater on an extended control channel and to convert, when necessary, inbound control channel information, received by the repeater, to control channel information suitable for transmission via the mobile transceiver on a control channel.

2. A mobile repeater, wherein a mobile transceiver that communicates with a fixed infrastructure is operably coupled to a repeater that communicates with at least one subscriber unit, the mobile repeater comprising:
   a database, operably coupled to the mobile transceiver and the repeater, that stores a registration received from the at least one subscriber unit and that stores an indication that the subscriber unit is registered with the fixed infrastructure, wherein the indication is stored in the database when the registration is sent to the fixed infrastructure via the mobile transceiver; and
   a converter, operably coupled to the mobile transceiver and the repeater, arranged and constructed to convert, when necessary, outbound control channel information, received by the mobile transceiver, to control channel information suitable for transmission via the repeater on an extended control channel and to convert, when necessary, inbound control channel information, received by the repeater, to control channel information suitable for transmission via the mobile transceiver.

3. The mobile repeater of claim 1, further comprising a converter operably coupled to the repeater such that the control channel is temporarily converted, from time to time, to a voice channel, thereby yielding the extended control channel.

4. The mobile repeater of claim 2, wherein the converter is arranged and constructed to:
   pass outbound information, received by the mobile transceiver, unchanged to the repeater for transmission; and
   pass inbound information, received by the repeater, unchanged to the mobile transceiver for transmission.

5. A mobile repeater comprising:
   a mobile transceiver arranged and constructed to communicate with a fixed infrastructure;
   a repeater, operably coupled to the mobile transceiver, arranged and constructed to communicate with at least one subscriber unit;
   a first encryption synchronization device, operably coupled to the mobile transceiver and the repeater, arranged and constructed to generate at least one of inbound subscriber encryption synchronization information and outbound subscriber encryption synchronization information, relative to an encrypted subscriber control channel that provides communications between the at least one subscriber unit and the repeater.

6. The mobile repeater of claim 5, further comprising a second encryption synchronization device, operably coupled to the mobile transceiver and the repeater, arranged and constructed to maintain at least one of inbound infrastructure encryption synchronization information and outbound infrastructure encryption synchronization information, relative to an encrypted infrastructure control channel that provides communications between the fixed infrastructure and the mobile transceiver.

7. The mobile repeater of claim 6, further comprising a decryptor, operably coupled to the mobile transceiver, the repeater, the first encryption synchronization device and the second encryption synchronization device, for decrypting based on at least one of the inbound subscriber encryption synchronization information and the outbound infrastructure encryption synchronization information.

8. The mobile repeater of claim 6, further comprising an encryptor, operably coupled to the mobile transceiver, the repeater, the first encryption synchronization device and the second encryption synchronization device, for encrypting based on at least one of the outbound subscriber encryption synchronization information and the inbound infrastructure encryption synchronization information.

9. In a wireless communication system comprising at least one subscriber unit and at least one mobile repeater, in wireless communication with a fixed infrastructure, wherein the wireless communication system supports services for use by the at least one subscriber unit, a method for a mobile repeater of the at least one mobile repeater to provide the services to a subscriber unit of the at least one subscriber unit, the method comprising steps of:
   providing, between the subscriber unit and the mobile repeater, an encrypted subscriber control channel;
   generating at least one of inbound subscriber encryption synchronization information and outbound subscriber encryption synchronization information, relative to the encrypted subscriber control channel; and providing the services to the subscriber unit using at least one of the inbound subscriber encryption synchronization information and the outbound subscriber encryption synchronization information.

10. The method of claim 9, further comprising steps of:

providing, between the fixed infrastructure and the mobile repeater, an encrypted infrastructure control channel;

maintaining at least one of inbound infrastructure encryption synchronization information and outbound infrastructure encryption synchronization information, relative to the encrypted infrastructure control channel; and providing the services to the subscriber unit using at least one of the inbound infrastructure encryption synchronization information and the outbound infrastructure encryption synchronization information.

11. The method of claim 10, the step of providing the services to the subscriber unit further comprising steps of:

receiving, from the subscriber unit, encrypted inbound control channel information via the encrypted subscriber control channel;

decrypting the encrypted inbound control channel information based on the inbound subscriber encryption synchronization information to provide decrypted inbound control channel information;

encrypting the decrypted inbound control channel information based on the inbound infrastructure encryption synchronization information to provide re-encrypted inbound control channel information; and transmitting, to the fixed infrastructure, the re-encrypted inbound control channel information via the encrypted infrastructure control channel.

12. The method of claim 10, the step of providing the services to the subscriber unit further comprising steps of:

receiving, from the fixed infrastructure, encrypted outbound control channel information via the encrypted infrastructure control channel;

decrypting the encrypted outbound control channel information based on the outbound infrastructure encryption synchronization information to provide decrypted outbound control channel information;

encrypting the decrypted outbound control channel information based on the outbound subscriber encryption synchronization information to provide re-encrypted outbound control channel information; and transmitting, to the subscriber unit, the re-encrypted outbound control channel information via the encrypted subscriber control channel.

* * * * *